(12) United States Patent
Kobayashi et al.

(10) Patent No.: US 8,415,932 B2
(45) Date of Patent: Apr. 9, 2013

(54) SWITCHING CONTROL CIRCUIT

(75) Inventors: Yosuke Kobayashi, Gunma (JP); Iwao Fukushi, Gunma (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 676 days.

(21) Appl. No.: 12/639,769

(22) Filed: Dec. 16, 2009

(65) Prior Publication Data

US 2010/0156372 A1   Jun. 24, 2010

(30) Foreign Application Priority Data

Dec. 18, 2008   (JP) ................................ 2008-322740

(51) Int. Cl.
*G05F 1/40*   (2006.01)
(52) U.S. Cl.
USPC ............................ 323/222; 323/285; 323/288
(58) Field of Classification Search ................. 323/222, 323/282–285, 288, 351, 901, 908
See application file for complete search history.

(56) References Cited

U.S. PATENT DOCUMENTS

| 5,646,514 | A | * | 7/1997 | Tsunetsugu | 323/288 |
| 7,307,406 | B2 | * | 12/2007 | Shirai et al. | 323/285 |
| 7,514,908 | B2 | * | 4/2009 | Hosokawa et al. | 323/222 |
| 8,159,204 | B2 | * | 4/2012 | Grant | 323/285 |
| 2009/0135632 | A1 | * | 5/2009 | Sohma | 363/89 |

FOREIGN PATENT DOCUMENTS

JP   2008-141832 A   6/2008

OTHER PUBLICATIONS

Patent Abstracts of Japan for Japanese Publication No. 2008-141832, publication date Jun. 19, 2008 (1 page).

* cited by examiner

*Primary Examiner* — Jessica Han
(74) *Attorney, Agent, or Firm* — Osha Liang LLP

(57) ABSTRACT

A switching control circuit includes an N-channel MOSFET having an input electrode applied with an input voltage and an output electrode connected to one end of an inductor and one end of a rectifying element. The other end of the inductor is connected to a first capacitor. A bootstrap circuit is configured to generate a bootstrap voltage on a second capacitor having one end connected to the output electrode of the N-channel MOSFET. The bootstrap voltage is required when the N-channel MOSFET is turned on. A driving circuit is configured to be applied with a driving voltage corresponding to the bootstrap voltage and turn on/off the N-channel MOSFET to generate an output voltage of a target level on the first capacitor. A clamping circuit is configured to clamp the driving voltage to be at a predetermined level or lower.

4 Claims, 1 Drawing Sheet

SWITCHING CONTROL CIRCUIT

CROSS-REFERENCE TO RELATED APPLICATION

This application claims the benefit of priority to Japanese Patent Application No. 2008-322740, filed Dec. 18, 2008, of which full contents are incorporated herein by reference.

BACKGROUND OF THE INVENTION

1. Field of the Invention

The present invention relates to a switching control circuit.

2. Description of the Related Art

Various types of electronic equipment use a DC-DC converter for generating an output voltage of a target level from an input voltage. FIG. 2 is a diagram illustrating a general configuration of a step-down DC-DC converter. A DC-DC converter 100 includes an N-channel MOSFET 110, Schottky barrier diodes 111, 112, an inductor 113, capacitors 114, 115, resistors 116, 117, a control circuit 118, a level shift circuit 119, and an inverter 120.

An input voltage $V_{IN}$ is applied to a drain of the N-channel MOSFET 110 through a terminal IN, and when the N-channel MOSFET 110 is turned on, an input voltage $V_{IN}$ is applied to the inductor 113, the capacitor 114 is charged, and an output voltage $V_{OUT}$ is raised. Thereafter, when the N-channel MOSFET 110 is turned off, by virtue of energy accumulated in the inductor 113, an electric current is passed through a loop including the Schottky barrier diode 111, the inductor 113, and the capacitor 114, the capacitor 114 is discharged, and the output voltage $V_{OUT}$ is lowered. In the DC-DC converter 100, the output voltage $V_{OUT}$ is controlled so as to reach the target level by turning on/off the N-channel MOSFET 110 by the control circuit 118 so that a feedback voltage $V_{FB}$ obtained by dividing the output voltage $V_{OUT}$ by the resistors 116, 117 reaches a predetermined level.

Moreover, the DC-DC converter 100 uses the N-channel MOSFET 110, in which ON resistance and loss are smaller than those in a case of a P-channel MOSFET, as a transistor for applying the input voltage $V_{IN}$ to the inductor 113. In a case where the N-channel MOSFET 110 is used as such, when the N-channel MOSFET 110 is turned on, a voltage of the source of the N-channel MOSFET 110 gets close to the input voltage $V_{IN}$. Thus, in order to keep the N-channel MOSFET 110 on, a voltage higher than the input voltage $V_{IN}$ by a threshold voltage $V_{TH}$ of the N-channel MOSFET 110 is required to be applied to the gate of the N-channel MOSFET 110. Moreover, in order to keep a state in which the ON resistance of the N-channel MOSFET 110 is sufficiently small, a voltage higher than the input voltage $V_{IN}$ by the order of 5V, for example, is required to be applied to the gate of the N-channel MOSFET 110.

Then, a method of using a bootstrap voltage in order to turn on the N-channel MOSFET 110 is generally employed (See Japanese Patent Laid-Open Publication No. 2008-141832, for example). In the DC-DC converter 100, a voltage $V_{REG}$ applied to a terminal REG is applied to the capacitor 115 through the Schottky barrier diode 112 and a terminal BC, so that a bootstrap voltage $V_{BT}$ is generated. Here, assuming that the voltage $V_{REG}$ is 5V and each forward voltage of the Schottky barrier diodes 111, 112 is 0.3V, such a state is considered that the N-channel MOSFET 110 is off and an electric current is passed through the loop including the Schottky barrier diode 111, the inductor 113, and the capacitor 114. In this case, a voltage $V_{SW}$ of a terminal SW is −0.3V, a voltage $V_{BC}$ of a terminal BC is 4.7V, and the bootstrap voltage $V_{BT}$ across the capacitor 115 results in 5V. Therefore, if the N-channel MOSFET 110 is turned on and the voltage $V_{SW}$ becomes equal to $V_{IN}$, $V_{BC}=V_{IN}+V_{BT}$. Then, the level shift circuit 119 performs level shift of a control signal outputted from the control circuit 118 based on the voltage $V_{BC}$ and the inverter 120 uses the bootstrap voltage $V_{BT}$ as a driving voltage, and thus, the N-channel MOSFET 100 can be kept on.

In the DC-DC converter 100 as above, the terminal IN and the terminal BC might be short-circuited due to adhesion of dust or the like. Here, assume such a case that the terminal IN and the terminal BC are short-circuited when the bootstrap voltage $V_{BT}$ is 5V. When the N-channel MOSFET 110 is turned on, an electric current is passed from the terminal IN to the terminal SW through the N-channel MOSFET 110. For example, assuming that the input voltage $V_{IN}$ is 15V, the current flowing through the N-channel MOSFET 110 is 1 A, and the ON resistance of the N-channel MOSFET 110 is 0.2Ω, the voltage $V_{SW}$ of the terminal SW is 14.8V. At this time, since the terminal IN and the terminal BC are short-circuited, a current path is formed from the capacitor 115 to the N-channel MOSFET 110, and thus, the capacitor 115 is discharged.

Then, when the capacitor 115 is discharged, the bootstrap voltage $V_{BT}$ is lowered, and thus, the N-channel MOSFET 110 is turned off. Even if the N-channel MOSFET 110 is turned off, the inductor 113 tries to continue passing the current, and the voltage $V_{SW}$ of the terminal SW becomes −0.3V. On the other hand, since the terminal IN and the terminal BC are short-circuited, the voltage $V_{BC}$ of the terminal BC is 15V. Therefore, a voltage between the terminal BC and the terminal SW is 15.3V. Thus, the voltage of 15.3V is also applied to the inverter 120, and assuming that the withstand voltage of the inverter 120 is 7V, for example, such a state occurs that the withstand voltage of the inverter 120 is exceeded. Moreover, if the voltage applied to the gate of the N-channel MOSFET 110 from the inverter 120 reaches the order of 15V, the withstand gate-source voltage of the N-channel MOSFET 110 might be exceeded.

SUMMARY OF THE INVENTION

A switching control circuit according to an aspect of the present invention, comprises: an N-channel MOSFET having an input electrode applied with an input voltage and an output electrode connected to one end of an inductor and one end of a rectifying element, the other end of the inductor connected to a first capacitor; a bootstrap circuit configured to generate a bootstrap voltage on a second capacitor having one end connected to the output electrode of the N-channel MOSFET, the bootstrap voltage required when the N-channel MOSFET is turned on; a driving circuit configured to be applied with a driving voltage corresponding to the bootstrap voltage and turn on/off the N-channel MOSFET to generate an output voltage of a target level on the first capacitor; and a clamping circuit configured to clamp the driving voltage to be at a predetermined level or lower.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
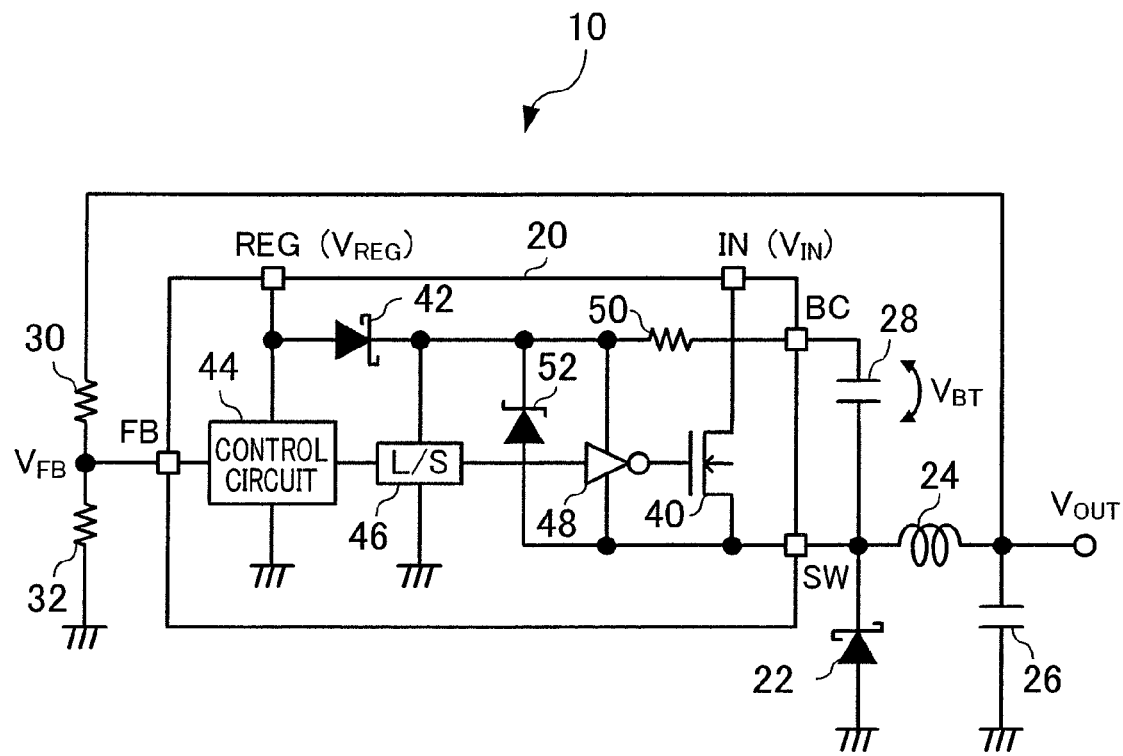
FIG. 1 is a diagram illustrating a configuration example of a step-down DC-DC converter including a switching control circuit according to an embodiment of the present invention.
Figure 2:
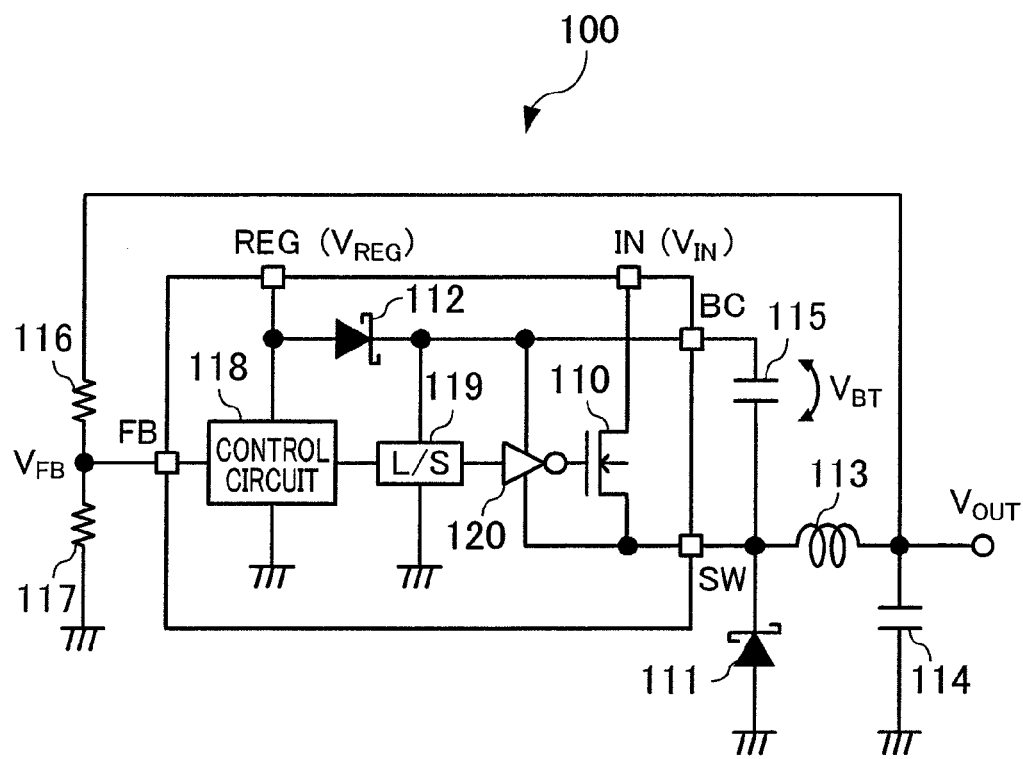
FIG. 2 is a diagram illustrating a general configuration of a step-down DC-DC converter.

FIG. 1 is a diagram illustrating a configuration example of a step-down DC-DC converter including a switching control circuit according to an embodiment of the present invention. A DC-DC converter 10 includes a switching control circuit 20, a Schottky barrier diode 22, an inductor 24, capacitors 26, 28, and resistors 30, 32. The switching control circuit 20 includes an N-channel MOSFET 40, a Schottky barrier diode 42, a control circuit 44, a level shift circuit 46, an inverter 48, a resistor 50, and a Zener diode 52.

The switching control circuit 20 is an integrated circuit provided with a terminal REG, a terminal IN, a terminal BC, a terminal SW, and a terminal FB. In the switching control circuit 20, on/off of the N-channel MOSFET 40 is controlled so that a voltage $V_{FB}$ applied to the terminal FB becomes a predetermined level, and thus, an output voltage $V_{OUT}$ at a target level is generated.

In the N-channel MOSFET 40, an input voltage $V_{IN}$ is applied to a drain (input electrode) through the terminal IN, a source (output electrode) is connected to the terminal SW, and an output signal of the inverter 48 is inputted to a gate. Therefore, if a potential difference between a voltage level of the output signal of the inverter 48 and a voltage $V_{SW}$ of the terminal SW becomes greater than a threshold voltage $V_{TH}$ of the N-channel MOSFET 40, the N-channel MOSFET 40 is turned on, and an electric current flows from the terminal IN to the terminal SW through the N-channel MOSFET 40.

The Schottky barrier diode (rectifying element) 22 has an anode grounded and a cathode connected to the terminal SW. The inductor 24 has one end connected to the terminal SW and the other end connected to one end of the capacitor (first capacitor) 26. The other end of the capacitor 26 is grounded, and a voltage charged in the capacitor 26 is the output voltage $V_{OUT}$. Therefore, if the N-channel MOSFET 40 is turned on, the input voltage $V_{IN}$ is applied to one end of the inductor 24 through the terminal SW, the capacitor 26 is charged, and the output voltage $V_{OUT}$ is raised. After that, if the N-channel MOSFET 40 is turned off, by virtue of energy accumulated in the inductor 24, an electric current is passed through a loop including the Schottky barrier diode 22, the inductor 24, and the capacitor 26, the capacitor 26 is discharged, and the output voltage $V_{OUT}$ is lowered.

The capacitor (second capacitor) 28 has one end connected to the terminal SW and the other end connected to the terminal BC. Then, the capacitor 28 is charged with a voltage $V_{REG}$ applied through the terminal BC, to generate a bootstrap voltage $V_{BT}$. This bootstrap voltage $V_{BT}$ is a voltage used for turning on the N-channel MOSFET 40. For example, it is assumed that the voltage $V_{SW}$ of the terminal SW is 0V in an initial state. In this case, if a voltage higher than the threshold voltage $V_{TH}$ (2V, for example) is applied to the gate of the N-channel MOSFET 40, the N-channel MOSFET 40 is turned on. However, if the N-channel MOSFET 40 is turned on, the voltage $V_{SW}$ of the terminal SW gets close to the input voltage $V_{IN}$ (15V, for example), and thus, in order to keep the N-channel MOSFET 40 on, a voltage higher than the input voltage $V_{IN}$ needs to be applied to the gate of the N-channel MOSFET 40. Therefore, by generating the bootstrap voltage $V_{BT}$ of the order of 5V, for example, using the voltage $V_{REG}$, the N-channel MOSFET 40 can be turned on even after the voltage $V_{SW}$ of the terminal SW gets close to the input voltage $V_{IN}$.

The resistor 30 has one end applied with the output voltage $V_{OUT}$ and the other end connected to one end of the resistor 32. The other end of the resistor 32 is grounded, and a voltage at connection point of the resistors 30, 32 is a feedback voltage $V_{FB}$ obtained by dividing the output voltage $V_{OUT}$ in resistance ratio between the resistors 30 and 32.

The Schottky barrier diode 42 (bootstrap circuit) has an anode applied with the voltage $V_{REG}$ through the terminal REG and a cathode connected to the terminal BC through the resistor 50. Here, assuming that the voltage $V_{REG}$ is 5V and each forward voltage of the Schottky barrier diodes 22, 42 is 0.3V, the bootstrap voltage $V_{BT}$, with which the capacitor 28 is charged, is considered. If the N-channel MOSFET 40 is turned off and the electric current is passed through the loop including the Schottky barrier diode 22, the inductor 24, and the capacitor 26, the voltage $V_{SW}$ of the terminal SW is –0.3V. If voltage drop at the resistor 50 is ignored, the voltage $V_{BC}$ of the terminal BC is 4.7V, which is lower than the voltage $V_{REG}$ only by 0.3V, which is the forward voltage of the Schottky barrier diode 42. Therefore, the bootstrap voltage $V_{BT}$ is 4.7–(–0.3)=5V. Thereafter, the N-channel MOSFET 40 is turned on and assuming that the voltage drop of the N-channel MOSFET 40 due to ON resistance is 0.2V, the voltage $V_{SW}$ of the terminal SW is 14.8V. As a result, the voltage $V_{BC}$ of the terminal BC results in 19.8V, which is obtained by adding the bootstrap voltage $V_{BT}$=5V to 14.8V. Even if the voltage $V_{BC}$ of the terminal BC becomes higher than the voltage $V_{REG}$, the current does not flow back toward the terminal REG from the terminal BC since the Schottky barrier diode 42 is provided.

The control circuit 44 outputs a control signal to turn on/off the N-channel MOSFET 40 so that the feedback voltage $V_{FB}$ to be applied to the terminal FB becomes a reference level corresponding to a target level of the output voltage $V_{OUT}$. For example, if the feedback voltage $V_{FB}$ is lower than the reference level, the control circuit 44 increases a proportion of the N-channel MOSFET 40 being on, while if the feedback voltage $V_{FB}$ is higher than the reference level, the control circuit 44 decreases the proportion of the N-channel MOSFET 40 being on.

The level shift circuit 46 is applied with the voltage $V_{BC}$ of the terminal BC as a voltage on a power source side through the resistor 50 and a ground voltage as a voltage on a ground side, and converts a control signal based on the voltage $V_{REG}$ outputted from the control circuit 44 into a control signal based on the voltage $V_{BC}$.

The inverter 48 (driving circuit) is applied with the voltage $V_{BC}$ of the terminal BC as a voltage on the power source side through the resistor 50 and the voltage $V_{SW}$ of the terminal SW as a voltage on the ground side. That is, the inverter 48 is applied with a driving voltage corresponding to the bootstrap voltage $V_{BT}$. On the basis of the control signal outputted from the level shift circuit 46, the inverter 48 controls on/off of the N-channel MOSFET 40 by changing a voltage level of the signal inputted to the gate of the N-channel MOSFET 40. Specifically, if the signal outputted from the level shift circuit 46 is at L level, the inverter 48 outputs an H-level signal corresponding to the voltage $V_{BC}$ to the gate of the N-channel MOSFET 40 so that the N-channel MOSFET 40 is turned on. On the other hand, if the signal outputted from the level shift circuit 46 is at H level, the inverter 48 outputs an L-level signal corresponding to the voltage $V_{SW}$ to the gate of the N-channel MOSFET 40 so that the N-channel MOSFET 40 is turned off.

The resistor 50 (current limiting circuit) has one end connected to the terminal BC and the other end connected to a cathode of the Zener diode 52. The Zener diode 52 (clamping circuit) has an anode connected to the terminal SW. The Zener diode 52 clamps the driving voltage of the inverter 48 to be at a predetermined level of the order of 6V or lower, for example, even if the terminal IN and the terminal BC are short-circuited and the bootstrap voltage $V_{BT}$ becomes extremely high, for example. The resistor 50 is used to limit the current flowing through the Zener diode 52 so that the clamp voltage by the Zener diode 52 is held at a predetermined level or lower, on the basis of current-voltage characteristics of the Zener diode 52. Depending on the current-voltage characteristics of the Zener diode 52, a configuration may be made without the resistor 50.

Subsequently, an operation of the DC-DC converter 10 will be described. Description will be made assuming that the input voltage $V_{IN}$ is 15V, the target level of the output voltage $V_{OUT}$ is 5V, the voltage $V_{REG}$ is 5V, the forward voltage of the Schottky barrier diode 22 is 0.3V, the threshold voltage $V_{TH}$ of the N-channel MOSFET 40 is 2V, and a breakdown voltage of the Zener diode 52 is 6V.

First, assuming that an operation of the DC-DC converter 10 is started in a state where the output voltage $V_{OUT}$ and the bootstrap voltage $V_{BT}$ is 0V. At this time, since the bootstrap voltage $V_{BT}$ is lower than 2V, the N-channel MOSFET 40 cannot be kept on. The capacitor 28 is applied with the voltage $V_{REG}$ through the terminal REG, the Schottky barrier diode 42, the resistor 50, and the terminal BC, and the bootstrap voltage $V_{BT}$ is raised.

If the bootstrap voltage $V_{BT}$ exceeds the threshold voltage $V_{TH}$ of the N-channel MOSFET 40, which is 2V, the inverter 48 can turn on the N-channel MOSFET 40 in a case where the control signal from the control circuit 44 is at L level. Then, the control circuit 44 changes the control signal so that the feedback voltage $V_{FB}$ becomes the reference level corresponding to the target level of the output voltage $V_{OUT}$.

It is assumed that the terminal IN and the terminal BC are short-circuited in a state where capacitor 28 is charged with the voltage $V_{REG}$ so that the bootstrap voltage $V_{BT}$ reaches 5V and the N-channel MOSFET 40 is turned on/off.

If the N-channel MOSFET 40 is changed from on to off, the inductor 24 tries to continue flowing the electric current, and thus, the current is passed through the loop of the Schottky barrier diode 22, the inductor 24, and the capacitor 26, and the voltage $V_{SW}$ of the terminal SW reaches −0.3V. Since the terminal IN and the terminal BC are short-circuited, the voltage $V_{BC}$ of the terminal BC reaches 15V. Therefore, the bootstrap voltage $V_{BT}$ across the capacitor 28 becomes 15.3V.

On the other hand, the voltage between the power source side and the ground side of the inverter 48, that is, the driving voltage of the inverter 48 is clamped to be held at the order of 6V by the breakdown voltage of the Zener diode 52. At this time, the resistor 50 functions so as to suppress the driving voltage of the inverter 48 to the order of 6V by limiting the current flowing into the Zener diode 52 from the terminal BC.

Therefore, according to an embodiment of the present invention, a switching control circuit can be provided having a protective function in a case where the terminal applied with the input voltage and the terminal applied with the bootstrap voltage are short-circuited. That is, in the switching control circuit 20, even if the terminal IN and the terminal BC are short-circuited, by virtue of the protective function by the Zener diode 52, it is prevented that the driving voltage of the inverter 48 exceeds the withstand voltage of the inverter 48. Moreover, since the voltage of the signal outputted from the inverter 48 to the gate of the N-channel MOSFET 40 is similarly clamped, it is also prevented that a gate-source voltage of the N-channel MOSFET 40 exceeds the withstand voltage.

Furthermore, in the switching control circuit 20, since a current amount of the current flowing through the Zener diode 52 is limited by the resistor 50, it is prevented that the clamp voltage of the Zener diode 52 becomes excessive.

The above embodiments of the present invention are simply for facilitating the understanding of the present invention and are not in any way to be construed as limiting the present invention. The present invention may variously be changed or altered without departing from its spirit and encompass equivalents thereof.

For example, the Schottky barrier diode 22 is used as a rectifying element when the N-channel MOSFET 40 is off in an embodiment of the present invention, but the rectifying element is not limited to that. For example, an N-channel MOSFET which is turned on/off in a complementary manner with the N-channel MOSFET 40 may be used as a rectifying element.

What is claimed is:

1. A switching control circuit comprising:
    an N-channel MOSFET having an input electrode applied with an input voltage and an output electrode connected to one end of an inductor and one end of a rectifying element, the other end of the inductor connected to a first capacitor;
    a bootstrap circuit configured to generate a bootstrap voltage on a second capacitor having one end connected to the output electrode of the N-channel MOSFET, the bootstrap voltage required when the N-channel MOSFET is turned on;
    a driving circuit configured to be applied with a driving voltage corresponding to the bootstrap voltage and turn on/off the N-channel MOSFET to generate an output voltage of a target level on the first capacitor; and
    a clamping circuit connected in parallel with the second capacitor and configured to clamp the driving voltage to be at a predetermined level or lower.

2. A switching control circuit comprising:
    an N-channel MOSFET having an input electrode applied with an input voltage and an output electrode connected to one end of an inductor and one end of a rectifying element, the other end of the inductor connected to a first capacitor;
    a bootstrap circuit configured to generate a bootstrap voltage on a second capacitor having one end connected to the output electrode of the N-channel MOSFET, the bootstrap voltage required when the N-channel MOSFET is turned on;
    a driving circuit configured to be applied with a driving voltage corresponding to the bootstrap voltage and turn on/off the N-channel MOSFET to generate an output voltage of a target level on the first capacitor;
    a clamping circuit configured to clamp the driving voltage to be at a predetermined level or lower; and
    a current limiting circuit configured to limit a current amount of a current flowing through the clamping circuit from the other end of the second capacitor.

3. The switching control circuit according to claim 2, wherein the clamping circuit includes a Zener diode having an anode connected to the output electrode of the N-channel MOSFET and a cathode connected to a power source side of the driving circuit; and wherein the current limiting circuit includes a resistor with one end connected to the other end of the second capacitor and the other end connected to the cathode of the Zener diode.

4. A switching control circuit comprising:
- an N-channel MOSFET having an input electrode applied with an input voltage and an output electrode connected to one end of an inductor and one end of a rectifying element, the other end of the inductor connected to a first capacitor;
- a bootstrap circuit configured to generate a bootstrap voltage on a second capacitor having one end connected to the output electrode of the N-channel MOSFET, the bootstrap voltage required when the N-channel MOSFET is turned on;
- a driving circuit configured to be applied with a driving voltage corresponding to the bootstrap voltage and turn on/off the N-channel MOSFET to generate an output voltage of a target level on the first capacitor; and
- a clamping circuit configured to clamp the driving voltage to be at a predetermined level or lower,
- wherein the clamping circuit includes a Zener diode having an anode connected to the output electrode of the N-channel MOSFET and a cathode connected to a power source side of the driving circuit.

* * * * *